(12) United States Patent
Hillmer et al.

(10) Patent No.: US 7,677,742 B2
(45) Date of Patent: Mar. 16, 2010

(54) MICROMIRROR ARRAY

(75) Inventors: Hartmut Hillmer, Kassel (DE); Jürgen Schmid, Weg in der Aue 38, 34128, Kassel (DE); Ingo Stadler, Kassel (DE)

(73) Assignees: Hillmer (DE); Jurgen Schmid (DE); Volker Viereck (DE); Friedrich Waitz Von Eschen (DE); Harald Waitz Von Eschen (DE)

( * ) Notice: Subject to any disclaimer, the term of this patent is extended or adjusted under 35 U.S.C. 154(b) by 407 days.

(21) Appl. No.: 10/583,490

(22) PCT Filed: Dec. 13, 2004

(86) PCT No.: PCT/DE2004/002720

§ 371 (c)(1),
(2), (4) Date: Sep. 26, 2006

(87) PCT Pub. No.: WO2005/059621

PCT Pub. Date: Jun. 30, 2005

(65) Prior Publication Data

US 2007/0146741 A1 Jun. 28, 2007

(30) Foreign Application Priority Data

Dec. 15, 2003 (DE) ................................. 103 58 967

(51) Int. Cl.
*G02B 5/08* (2006.01)
(52) U.S. Cl. ..................................................... 359/850
(58) Field of Classification Search ................. 359/850, 359/855, 871, 872
See application file for complete search history.

(56) References Cited

U.S. PATENT DOCUMENTS 5,903,383 A 5/1999 Bernstein et al.

(Continued)

FOREIGN PATENT DOCUMENTS

DE 199 07 943 A1 9/2000

(Continued)

OTHER PUBLICATIONS

International Search Report PCT/DE2004/002720 dated Apr. 12, 2005.

*Primary Examiner*—Euncha P Cherry
(74) *Attorney, Agent, or Firm*—Ostrolenk Faber LLP

(57) ABSTRACT

The invention relates to a microstructured technological system and, in particular, micromirror arrangements. The aim of the invention is to produce facade elements for buildings having large areas in square centimetres and above, at reduced cost. The entire micromirror arrangement can be produced as a flat, architectonically useable structural element in a modularly replicable manner. According to the invention, the control electronic system, which contains the logics which are controlled as mirror elements, is arranged in the centre of a control device at a specific, remote distance from which an addressing network is used to control the individual mirror elements or modules. Said addressing network is already integrated into the flat modules during production and to a large degree, in the form of printed lines. As a result, the necessity of incorporating silicon-based chip technology into the facade elements, which is expensive, is no longer necessary. Also, essentially less expensive materials than highly pure silicon are used in the production of the micromirror arrangements. Production costs, which are at least in the same size order as other, traditional, high quality façade elements, result therefrom.

30 Claims, 8 Drawing Sheets

U.S. PATENT DOCUMENTS

| | | |
|---|---|---|
| 6,031,657 A | 2/2000 | Robinson et al. |
| 6,632,373 B1 | 10/2003 | Rosa et al. |
| 6,639,572 B1 | 10/2003 | Little et al. |
| 2002/0015215 A1 | 2/2002 | Miles |
| 2002/0047172 A1 | 4/2002 | Reid |
| 2002/0171327 A1* | 11/2002 | Miller et al. ............... 310/309 |

FOREIGN PATENT DOCUMENTS

| | | |
|---|---|---|
| DE | 101 07 842 A1 | 9/2002 |
| EP | 0 877 272 | 11/1998 |

* cited by examiner

MICROMIRROR ARRAY

CROSS REFERENCE TO RELATED APPLICATIONS

The present application is a 35 U.S.C. §371 National Phase conversion of PCT/DE2004/002720 filed Dec. 13, 2004, which claims priority of German Patent Application No. 103 58 967.8 filed Dec. 15, 2003 which is herein incorporated by reference. The PCT International Application was published in the German language.

BACKGROUND OF THE INVENTION

Prior Art

The present invention relates to microstructure technologies and in particular to micromirror arrangements. In particular, the invention relates to a micromirror apparatus and micromirror arrays.

These micromirror arrays are specifically designed arrangements of miniaturized mirrors with a size in the order of magnitude of a few square micrometers. They are widely used as three-dimensional light modulators. In detail, micromirror arrays such as these and as disclosed in EP 0 877 272 contain a plurality of individual bodies which are connected to a common base mounting surface, in which one individual body contains at least one standing holding element, which is raised above the base mounting surface, effectively a holding block for an element which is connected to it and has an optically reflective effect, that is to say a mirror element, with the elements of the individual bodies being structural elements of the layers of a thin-film production process, in which conventional thin-film production techniques such as vapor-deposition, electroplating, sputtering and wet-chemical or dry-chemical etching of layer material are used in conjunction with lithographic techniques in order to make it possible to specifically form the desired structures in these physically small areas.

In a micromirror array such as this, each individual mirror element can be electrically driven separately via a corresponding addressing circuit arrangement, in order to make it possible to move one mirror element from a mechanically stable "ON" mirror position to a second "OFF" mirror position. In order to allow it to move, the mirror element must be able to react by movement to a magnetic, electrostatic and/or thermally/mechanically acting force which has a corresponding locally limited effect.

These arrangements are used in and applied to the fields of optical information processing, projection displays, video and graphics monitors, television and electrophotographic printing. In this case, the micromirror array is used to create a pixel-true image between an image wave with a large number of pixels and a target surface, for example a display. This image, which touches each mirror on a separate pixel basis, requires an extremely high degree of manufacturing accuracy for the production of micromirror arrays such as these. Furthermore, this type of use of such micromirror arrays virtually necessarily implies that the corresponding electronics circuit, which contains the logic for the "ON/OFF control" and the corresponding individual addressing logic for the respective mirror elements are extremely expensive, particularly as a result of the use of relatively expensive, high-purity silicon for the circuit mentioned above, while their production requires an extremely long development time and production effort, because of their small area.

According to one fundamental major idea of the present invention, it would now be desirable to use similar types of micromirror arrangements which have a large number of micromirrors placed next to one another for very different purposes, specifically to use them as large-area, planar components in the facade of buildings and in particular in the glazing of buildings, for example in windows, in order to use a wide range of variants of technical effects for the deflection of light on the mirror surfaces.

One object of the present invention is thus to provide an apparatus which, with or without the capability to actuate individual mirror elements, is suitable for being produced as a facade element for buildings, in comparison to the three-dimensional light modulators mentioned initially with a large area in the region of square decimeters or more, and which can be produced at low cost.

SUMMARY OF THE INVENTION

The subject matter of the apparatus achieves this object.

The present invention is based on the fundamental discovery that a micromirror arrangement for the building-facade purposes of the present invention can be produced much more easily, with less development effort and, in comparison to already known three-dimensional light modulators, essentially without any significant components of expensive silicon material in the circuitry. For this purpose, it is proposed that the entire micromirror arrangement be produced as a modular, replicable, large-area, architectonically usable component, in which the control electronics which contain the logic that is intended to drive mirror elements is provided centrally in a dedicated remotely located controller, from which an addressing network originates for driving the individual mirror elements or modules, and which is provided, largely in the form of printed lines in the large-area modules, such that it is actually integrated during its production. This avoids the necessity to implement expensive silicon-based chip technology in the facade element itself. Furthermore, considerably cheaper materials than high-purity silicon are used to produce the micromirror arrangements themselves. This results in production costs which are at least in the same order of magnitude as those of other, conventional facade elements.

According to one special, very low-cost exemplary embodiment to the present invention, the mirror elements essentially cannot move and are not provided with an individual drive capability of this usual type. The mirror elements in this simple embodiment then have fixed, preset tilt angles relative to any reference plane, for example the plane of their jointly used base mounting surface which, when used as an architectonic component in the facade or glazed area, is located with its plane parallel, at least in most cases.

The materials for the base mounting surfaces on which a respective large number of individual bodies stand and to which the mirror elements are fitted may actually be, for example, of glass, Plexiglas, plastics, in particular polymers, such that at least the material value of the base mounting surface of a module has a very short edge length, for example of barely 25 cm. In this case, it is obvious that, when using apparatuses according to the invention such as these, particularly when they are used to fill areas in the window area, the base plate or base mounting sheet to which the individual mirror elements are fitted should be composed of a material which is transparent to visible light. This is not absolutely essential when used in the facade itself, since in general it will not be necessary to see the masonry through the flat module according to the invention.

Fundamentally, one recommended material for the holding elements for the individual mirror elements is one which has a certain long-term stable dimensional stability and at the same time is highly suitable for being used as a sacrificial layer in an etching process. Various polymers may be used in this case, such as thermotropic main-chain liquid crystalline polymers and, in a particular manner, also conventionally available photoresist, which can be applied uniformly in order to form a uniform layer thickness. In order to achieve high-strength holding blocks, these points can be manufactured completely in advance from dielectric materials, for example from suitable silicon-nitrogen compounds, such as $Si_3N_4$, or silicon oxides, in particular silicon dioxide ($SiO_2$).

Alternatively, the material for the holding elements can be chosen such that it allows selective growth, in particular by the use of a electrochemical action in polymethyl methacrylate (PMMA) formed by deep lithography.

A reflective single metal layer or, for example, a dielectric multiple layer may be used as the material for the mirror elements, which is designed such that it has a reflection band in the visible spectral range (for example alternate $Si_3N_4$ and $SiO_2$ $\lambda/4$ layers) with a reflective single layer or a reflective polymer layer, for example poly[p-phenylene].

In this case, a person skilled in the art will understand that, in the case of the low-price variant with fixed, predetermined tilt angles which cannot be varied for the mirror elements, the choice of the tilt angle will be of considerable importance for the respective purpose to be achieved. If, by way of example, the surface normals which exist for planar mirror elements are all the same and are all within or parallel to the window plane, then the mirror elements will themselves be horizontal when the window is installed. They would thus deflect a very large amount of the light coming from above, irrespective of whether this is diffuse or direct radiation, upward toward the ceiling of the room. This effect can advantageously be made use of in order to additionally illuminate the room, and possibly to reduce disturbing direct solar radiation.

Particularly when the micromirror apparatus according to the invention, as a flat module, contains connecting elements by means of which it can be connected at the edge to other apparatuses of the same type, simple modular construction and removal to form large areas is possible. This may be done, for example, by means of catches, other lockable plug connections or other connecting elements known from the prior art, such as those which latch in.

A person skilled in the art should also understand that the choice of the size of the mirror area as well as the choice of the mirror shape should be considered in depth, and should be matched to the purpose of the final component (or of the system). In this case, it is recommended that a geometric shape be used for the mirror surfaces which, particularly when the mirrors can be adjusted over a wide angular range, should fill the area as well as possible in order, for example, to allow the greatest possible proportion of the radiation to be completely reflected back or further into the room interior, if this is desired.

The mirror elements may also have a curved shape, particularly when they can remain in this shape without the influence of external forces. This allows interesting visual effects to be achieved, particularly when subject to direct solar radiation, since the effect of a convex or concave curved mirror is then achieved.

If the mirror elements are arranged in the form of a regular matrix comprising parallel rows and parallel columns, then this results in simple production, since the structures can be replicated relatively easily for production, as is particularly important for all of those embodiments in which electrical supply lines must be included for individual mirror elements (see further below) or for combined groups of mirror elements during the lithographic production process.

In one embodiment according to the invention with moving mirror elements, in which a mirror element is designed as a structural element of a single metal layer or of a dielectric multiple layer with a conductive single layer, or of a conductive polymer layer, or a polymer multiple layer, with reflective characteristics, and in which the mirror element is designed to move relative to the base mounting surface, for an actuation mechanism which acts on the mirror element, by virtue of its own predetermined relatively low bending stiffness or the relatively low bending stiffness of its connecting link or links to the holding element, this results, via the partially conductive characteristic of the mirror surface, in a contact point for actuation of the mirror element via various forces, as is known per se in the prior art. In this case, in particular, it is possible to use electrostatic activation, which will be described in more detail further below, magnetic activation, piezoelectric activation, or thermal activation.

If the actuation mechanism for the mirror elements—as is preferred in this case—is intended to be based on electrostatic forces, then a first electrode is expediently associated with the mirror element, and a second electrode is associated with the base mounting surface. In this case, the second electrode may also optionally be in the form of a flat electrode, for a plurality or all of the mirror elements, on the base mounting surface, and may be firmly connected to it.

In this exemplary embodiment, an electrical supply line and contact between the electrodes and individual single bodies or groups of individual bodies can preferably be provided, which leads to one of the outer edges of the apparatus, in order that it can be passed on from there. In particular, the electrical supply lines are intended for computer-controlled addressing and actuation of the individual-body movement, and thus the movement of the mirror elements, via the electrode pairs as planar lines (integrated interconnects), results in easy handling during the laying of the facade components according to the present invention, as well as simplified maintenance and reduced susceptibility to corrosion and other damaging environmental influences.

The connecting elements mentioned above advantageously contain not only the mechanical coupling elements but also the corresponding electrical plug-in connections in order to ensure both the mechanical and the electrical connection by means of a single plugging-in process. Simple electrical connections to a controller are thus possible, which is used jointly for controlling the individual mirrors or small groups of individual mirrors for a large number of plug-together individual modules according to the invention.

If, in a further advantageous manner, a mirror element is connected via, for example, an elongated bridging element of predetermined bending stiffness to the holding element, then this results in simple dimensioning and design of the individual layer thicknesses and lengths on the basis of the relationship between the force field and the tilt angle achieved for the mirror element by virtue of the simple lever law and the relatively simple bending mechanics of a "beam" which is clamped in at a free end. The complex deformation of the connecting link (or cantilever, bending bar) is shown in FIG. 3. The movement of the mirror plane, effectively tilting or a pivoting movement of the mirror plane, may in this case be related to an axis which is at right angles to the alignment of the bridging element and at the same time runs parallel to the base mounting surface. In order to assist understanding, a tilting or pivoting movement is thus assumed in the following text, and reference is made to the associated axis. This embodiment is simple to manufacture, since the bridging element may also once again be a structural element of a layer. Depending on the initial tilt, tilt angles θ of between about −80° and +30° are possible, for example with an initial tilt of 30°, and when an actuation voltage can draw the mirror element up to 80°, with θ=0° in this case corresponding to the horizontal in the installed state.

If, in a further advantageous manner, the mirror element is attached to two elongated bridging elements which, running in an essentially parallel direction, form a pivoting axis for the area of the mirror element, and act on opposite sides of the mirror element, and the twisting stiffness of the bridging elements about their pivoting axis is matched to the electrostatic forces between the electrodes such that a pivoting movement of the individual body can be carried out with a specifically variable deflection angle relative to the base mounting surface, then, when the electrodes are appropriately charged, the attraction or repulsion results in a tilting movement of the mirror element about the pivoting axis, which is at right angles to the pivoting axis of the above-mentioned example with a bridging element. The tilt angle φ can in this case be adjusted very simply without any initial tilt between about −80° and +80°, when the actuation voltage for electrostatic actuation can draw the mirror element up to ±80°. The angle φ=0° in this case corresponds to the horizontal. Very wide tilt angle ranges are thus possible.

The central advantage of electrostatic actuation is that only small holding currents are required, if the electrical insulation is good.

If, in a further preferred manner, a mirror element is mounted in a universally jointed manner by means of a further bridging element pair, which is provided within the pivoted area, then this results in the full angular matching functionality. The angles θ and φ can be adjusted virtually independently of one another. The mirror itself can thus be readjusted very well independently of or as a function of the height of the sun throughout the day, in order to produce the correct mirror position for the various applications. This is dependent on a control program being implemented in the controller, which has the appropriate readjustment logic and appropriate driver programs for the overall system to be used. In this case, by way of example, the overall system may comprise a large number of 2048 individual modules, which are in each case subdivided into 4×4, that is to say groups of 16, for in each case one building window or a window of a mobile system with an area of 1 m², with the overall system containing a total of 128 windows. In this case, sun level sensors may, of course, also be used in order to provide control inputs for the readjustment logic. In this case, it should be clear that the readjustment aim may differ on an individual basis, depending on the use and the individual requirement.

When, as is also preferable, the mirror element is oriented with respect to the pivoting axis such that a pivoting axis divides the mirror element off-center, then a further parameter for optimization of the tilt angle is found, in which case, by way of example, the short side can be used as the side for attraction or repulsion of electrodes. A short lever then means a wide range of tilt movement, but requires a correspondingly high force.

BRIEF DESCRIPTION OF THE DRAWINGS

Exemplary embodiments of the invention will be explained in more detail in the following description, and are illustrated in the drawings, in which.

DESCRIPTION OF A PREFERRED EMBODIMENT

Identical reference symbols denote identical or functionally identical components in the figures.

Figure 1:
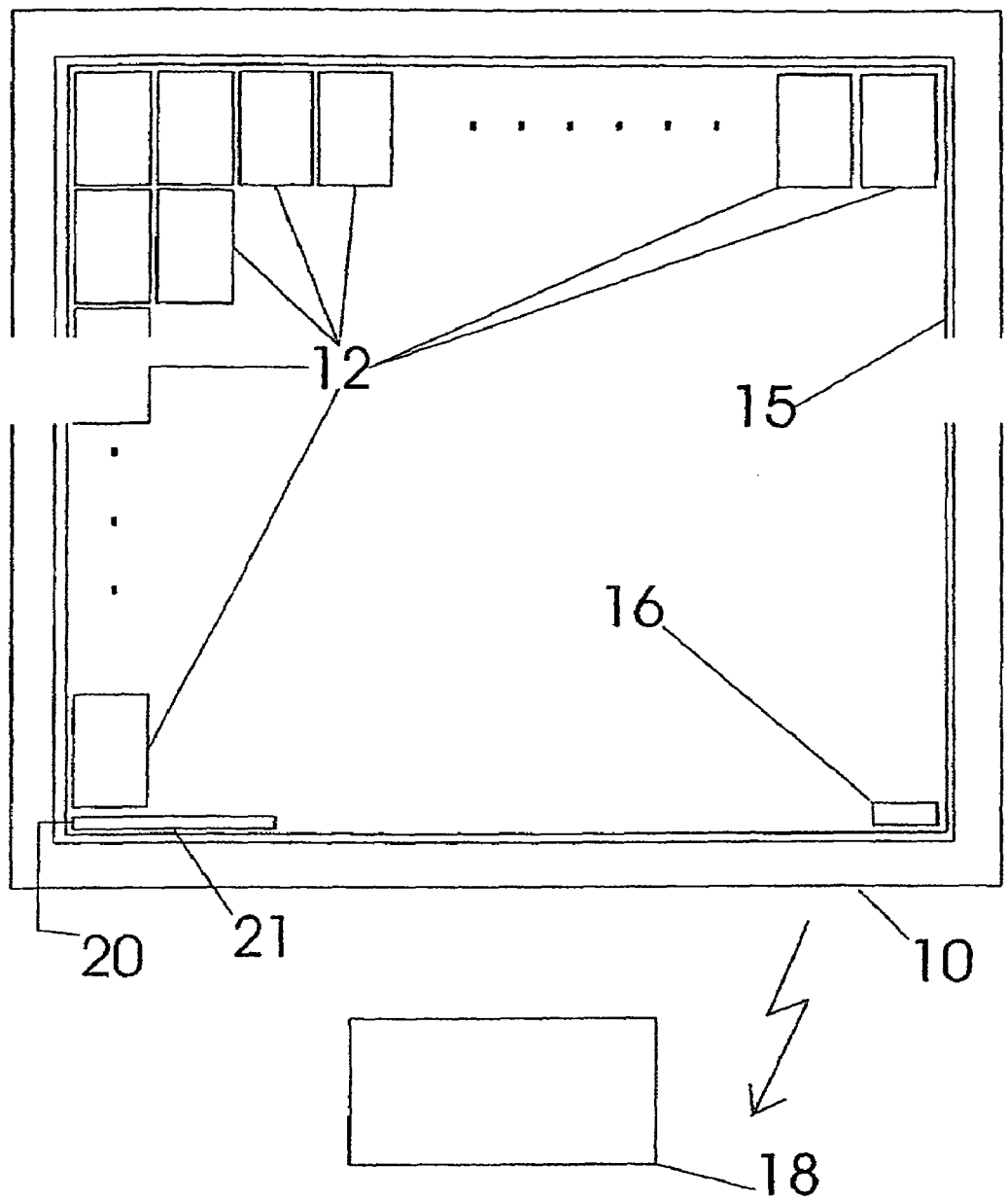
FIG. 1 shows an illustration in the form of a schematic view of an overall system according to one preferred exemplary embodiment of the present invention, containing a panel appropriate for a window pane with a large number of individual modules according to the invention, and the associated control devices.
Figure 10:
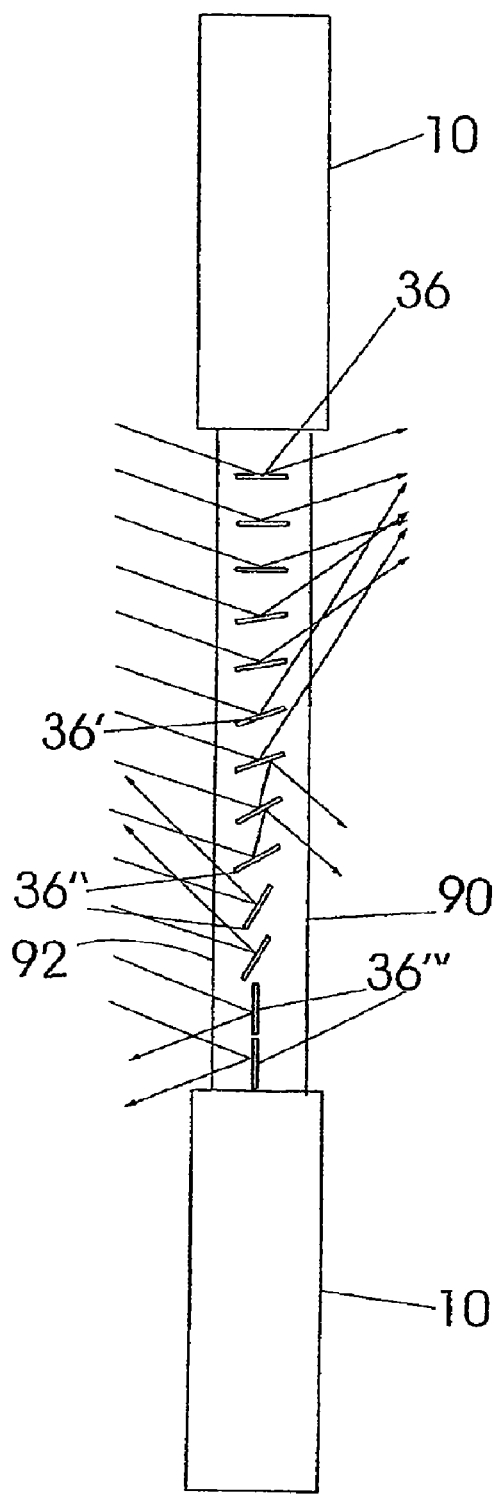
FIG. 10 shows a schematic cross-sectional illustration, in the form of a sketch, of a panel according to the invention comprising individual modules, installed in a window, illustrated in a simplified form.

With reference to FIG. 1 and in addition with reference to FIG. 10 (cross section), a panel 15 according to the invention is shown containing a large number of individual modules 12 which are arranged like a matrix (in the form of an array), with the external dimensions of the panel 15 corresponding approximately to the dimensions of the visible area of a window surface, which is arranged within a window frame 10. As FIG. 10 additionally shows, the panel 15 is arranged in the interior between an outer glass pane 90 and an inner glass pane 92. The individual modules 12 themselves once again contain a large number of optically reflectively acting micromirrors, which are likewise arranged like a matrix in regular rows and columns on a common mounting surface, although this is not illustrated in FIG. 1, in order to improve the clarity. As can likewise be seen from FIG. 1, the individual modules 12 have an identical shape and are connected to one another, with further details being illustrated in FIG. 2.

A drive network essentially comprising planar lines in the interior of each individual module 12 and contacts between the individual modules is provided in order to specifically move the individual bodies mentioned above, with their micromirrors, according to the invention, by means of appropriate electrical actuation based on electrostatic forces, in order in this way to allow light to be specifically deflected. A supply line 20 is provided for this purpose and provides a DC voltage of, for example, the order of magnitude of 60 V via a connection 21 that is provided for this purpose to an individual module 12 which is designed specifically for this purpose.

Furthermore, a sensor 16 is provided, which is likewise operatively connected to the actuation network and is designed to receive control signals from a controller 18 without the use of wires or—if wires are used, then advantageously encapsulated with a connection for supplying electrical power to the panel—in order in this way to deliberately electrostatically actuate individual single modules 12 or individual micromirrors, or groups of micromirrors. The sensor may in this case, for example, be an infrared (IR) or ultrasound sensor, or a radio sensor. The controller 18 contains the necessary hardware in order to run the program which contains all of the algorithms which are necessary in order to move the mirror in accordance with a programmed movement. These algorithms are well known from the prior art.

The corresponding driver programs for implementation of a specific drive geometry and an associated specific drive network are simple to produce and are contained in the controller 18.

The coupling between individual modules 12 as shown in FIG. 1 will be described in more detail with further reference to FIG. 2.

Two individual modules 12 A and 12 B with a square contour are arranged such that their respective edge sides abut against one another, with their edges and corners flush. A latching connection 22 *a* and a further latching connection 22 *b* are advantageously each provided off-center, in order to mechanically connect the two individual modules 12 A and 12 B to one another at two points. Furthermore, an electrical contact 24 is provided, and makes the electrical connection between the drive networks of the two individual modules. Only two individual lines are illustrated in FIG. 2, (+ and –), although, of course, a plurality of such electrical contacts can also be provided when this is worthwhile for circuitry or production reasons, for example with the aim of there being a smaller number of crossing points between lines that cross over one another. In order to restrict the complexity of the drive network and the complex production process constraints that result in this case for the implementation of these lines in the form of a planar circuit, during a thin-film production process, it is proposed that entire groups of individual bodies be driven jointly if required, thus resulting in the micromirrors all carrying out approximately the same pivoting movement, with the individual bodies being manufactured identically. For example, one or more rows of individual bodies of an individual module 12 may be used as sub-groups. In the same way, individual columns or a plurality of columns may be driven jointly using the same control signal.

The circuit within one row may, for example, comprise a series circuit of a complete row or specifically chosen sub-sections of a row, depending on the magnitude of the voltage drop during the activation of a single individual body. In order to make it possible to remain in the preferred low-voltage range, it may thus be worthwhile providing a parallel circuit of series circuits for the above-mentioned sub-groups in a single row.

Figure 3:
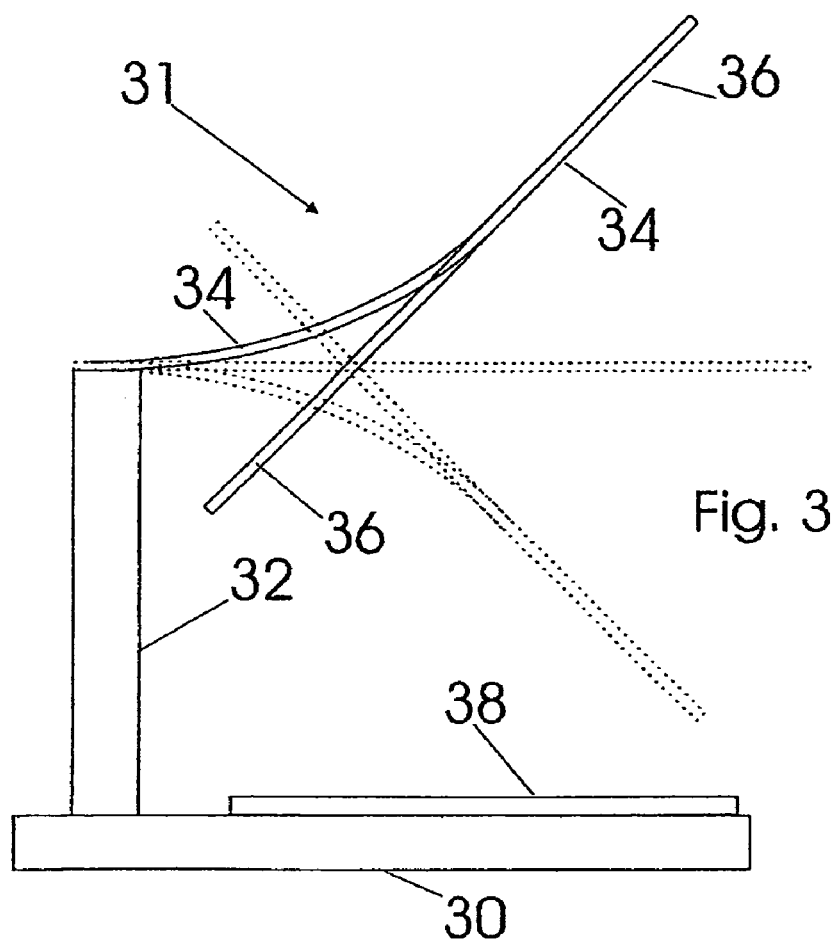
FIG. 3 shows a schematic cross-sectional illustration of an individual body with a micromirror, in the way in which a large number of such mirrors are arranged repeatedly on an individual module 12 in FIG. 1, according to a first exemplary embodiment of the present invention.
Figure 4:
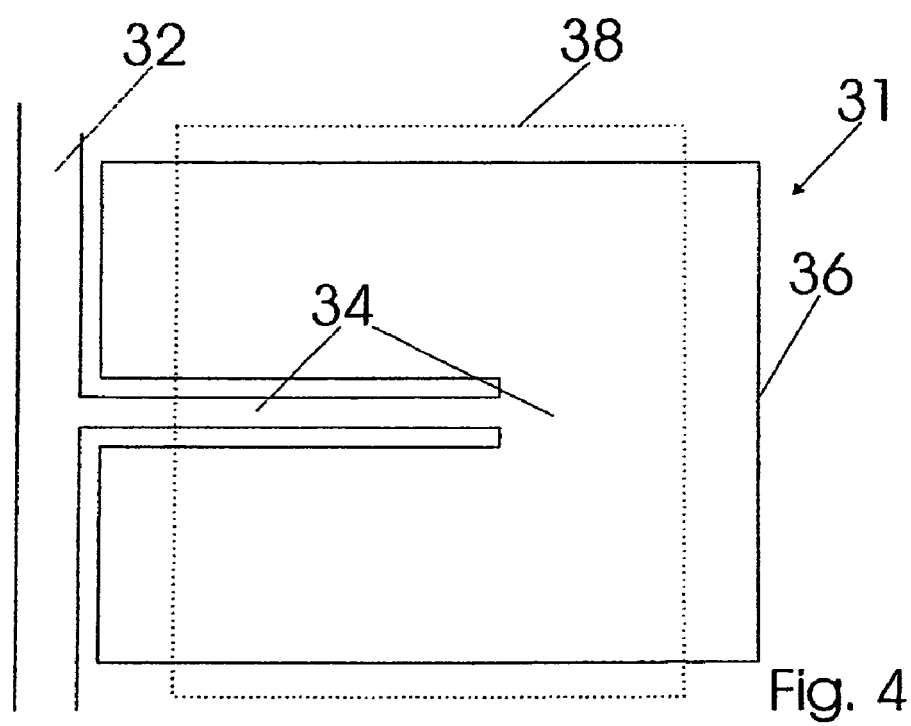
FIG. 4 shows an illustration in the form of a schematic plan view of the individual body illustrated in FIG. 3.

With further reference to FIG. 3 and FIG. 4, the following text describes the structural design of an individual body to which a micromirror is fitted. The entire individual body is referred to by the reference symbol 31. A holding element 32 with a suitable cross section and with a suitable height with respect to the pivoting movement of the micromirror 36 is provided on a base mounting surface 30, as has already been described further above. A bridging element 34 is attached to that end section of the holding element 32 which is opposite the base mounting surface, which bridging element 34 has an elongated shape, and the micromirror 36 is fitted to it. The bridging element 34 has an end section by means of which it is attached to the holding element 32, and has a free end section which floats in the air, in order that its free end can be deflected elastically from a rest position, which is illustrated horizontally in FIG. 3, by a force which is directed upward and downward in FIG. 3. In this case, at least one subarea of the bridging element 34 advantageously represents one electrode, and the opposing electrode 38 is associated with the base mounting surface 30 and is firmly connected to it by means of an appropriate thin-film process.

As shown in FIG. 4, the bridging element is elongated and, see also FIG. 3, is relatively thin, in order to make it possible for the bridging element 34 to be suitably elastic in each case for the actuation voltages. The micromirror 36 is a layer in its own right, and has a shape which allows it to be moved upward and downward, preferably in the manner shown in FIG. 3, without colliding with the bridging element itself or with the opposing electrode. It therefore preferably has a cutout around one subsection of the bridging element 34, with this subsection being associated with the holding element.

The cross-sectional shape of the holding element 32 may be varied over a wide range provided that the required strength is provided in order to allow precise micromirror movement to be carried out. The edge dimensions ax and ay of the micromirror 36 can be varied over a wide range, in which case the height and strength of the holding element 32 must then be designed appropriately for this purpose in order to ensure interference-free movement of the micromirrors 36. In this case, the edge lengths of the micromirrors can preferably be varied over a wide range between a few micrometers and a few millimeters, for example between 5 micrometers and 5 millimeters. The sizes of the micromirrors 36 should also be made dependent on the subsequent purpose of the individual modules 12 or panels 15. The greater the expected mechanical stress, the smaller the sizes of the mirrors should be in order that they react as little as possible to normally relatively low-frequency interference oscillations and are insensitive to strong vibration, that is to say they have a very high level of mechanical robustness.

The contact between the bridging element 34, which is in the form of an electrode, and the associated part of the connecting network can preferably be made via the holding element 32 if the connecting network is arranged as here preferably in the lower area of FIG. 3, for example shortly above the base mounting surface, and expediently being electrically isolated from it. If the bridging element 34 is composed of a metal or at least has a metal coating which at the same time has electrically highly conductive and good reflective characteristics, then the contact between the bridging elements and the connecting network can be made, for example, via a hole (via) through the holding element 32, or, alternatively, it can also run at the edge on it, as seen from top to bottom in FIG. 3. The opposing electrode 38 is likewise composed of conductive material and, depending on the material which is used for the base mounting surface 30, may possibly also be isolated from it by means of an insulating layer, although this is not illustrated in FIG. 3, in order to improve the clarity.

If the networks for the electrode and opposing electrode are supplied appropriately with voltage so that an attraction force or a repulsion force is formed between the electrodes, the mirrors move as is indicated in FIG. 3, in accordance with the laws of electrostatics and the forces in an electrical field.

Figure 5:
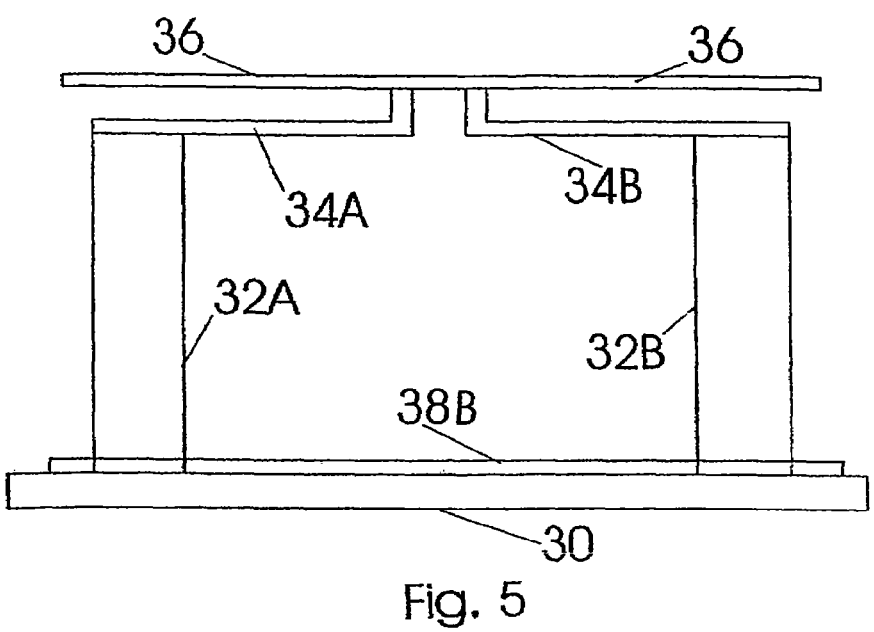
FIG. 5 shows a schematic front elevation illustration of an individual body, in the way in which a large number of such bodies are arranged repeatedly in an individual module 12 in FIG. 1, in one preferred variant according to the invention, in which the micromirror is suspended on two sides.
Figure 6:
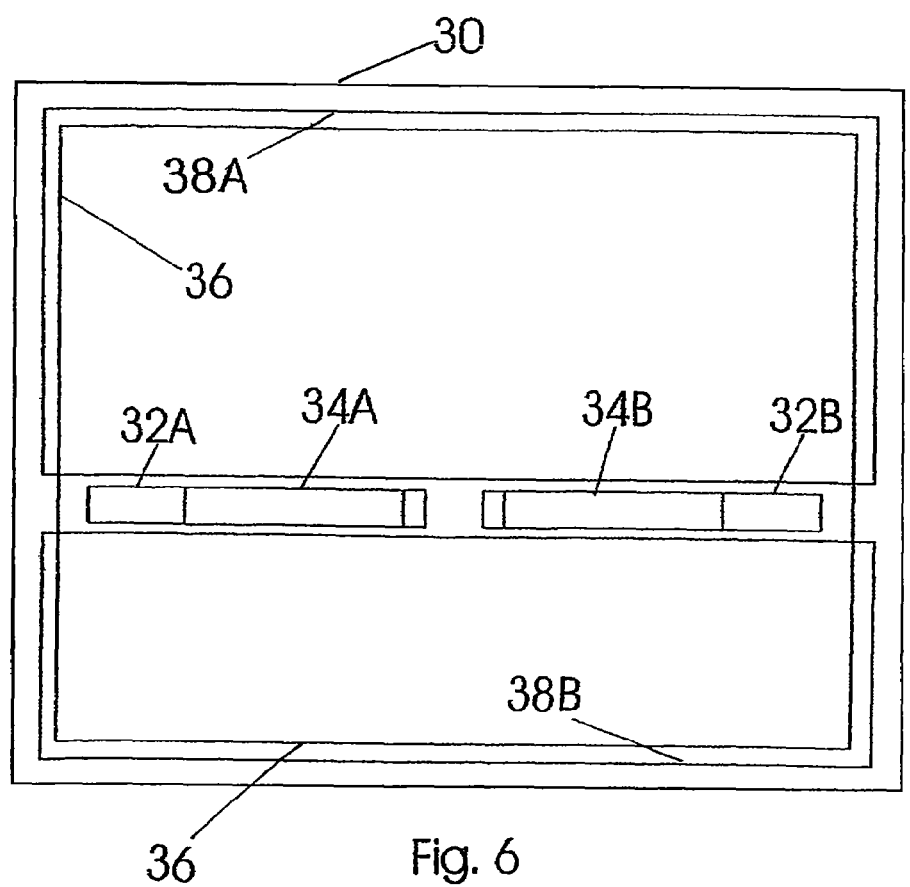
FIG. 6 shows an illustration in the form of a plan view of the individual body shown in FIG. 5.

With further reference to FIGS. 5 and 6, a further preferred exemplary embodiment for the design of an individual body according to the invention will be described in more detail in the following text. In this exemplary embodiment, the micromirror 36 is attached to two bridging elements 34 A and 34 B, with the bridging elements themselves each being mounted on a specific holding element 32 A or 32 B, respectively. As shown in more detail in FIG. 6, this is an asymmetric arrangement, as is shown as a variant in FIG. 7 b).

In this exemplary embodiment, the micromirror 36 pivots about an axis lying on the plane of the drawing in FIG. 5, since the bridging elements 34 A and 34 B are manufactured as mechanical elements which have the capability to twist easily and are activated in the same way by electrodes, as in the previous exemplary embodiment. In this case, the micromirror 36 is expediently used as an electrode, and two opposing electrodes 38 A and 38 B are provided and are arranged on the base mounting surface on opposite sides of the pivoting axis, see FIG. 6. In this exemplary embodiment as well, contact can be made between the micro-mirror 36 and the holding blocks 32 A and 32 B through vias. In addition, only one electrode pair may be provided.

Furthermore, with regard to the embodiment variants described above, it should be noted that one and the same holding block 32, 32 A or 32 B may be used not only for a bridging element 34, 34 A or 34 B, but can also be used at the same time for the next bridging element. For this purpose, one bridging element expediently extends on one side, and one bridging element on the opposite side of the holding element.

Embodiment variants of the exemplary embodiments mentioned above will be described in the following text with further reference to FIG. 7.

Figure 7:
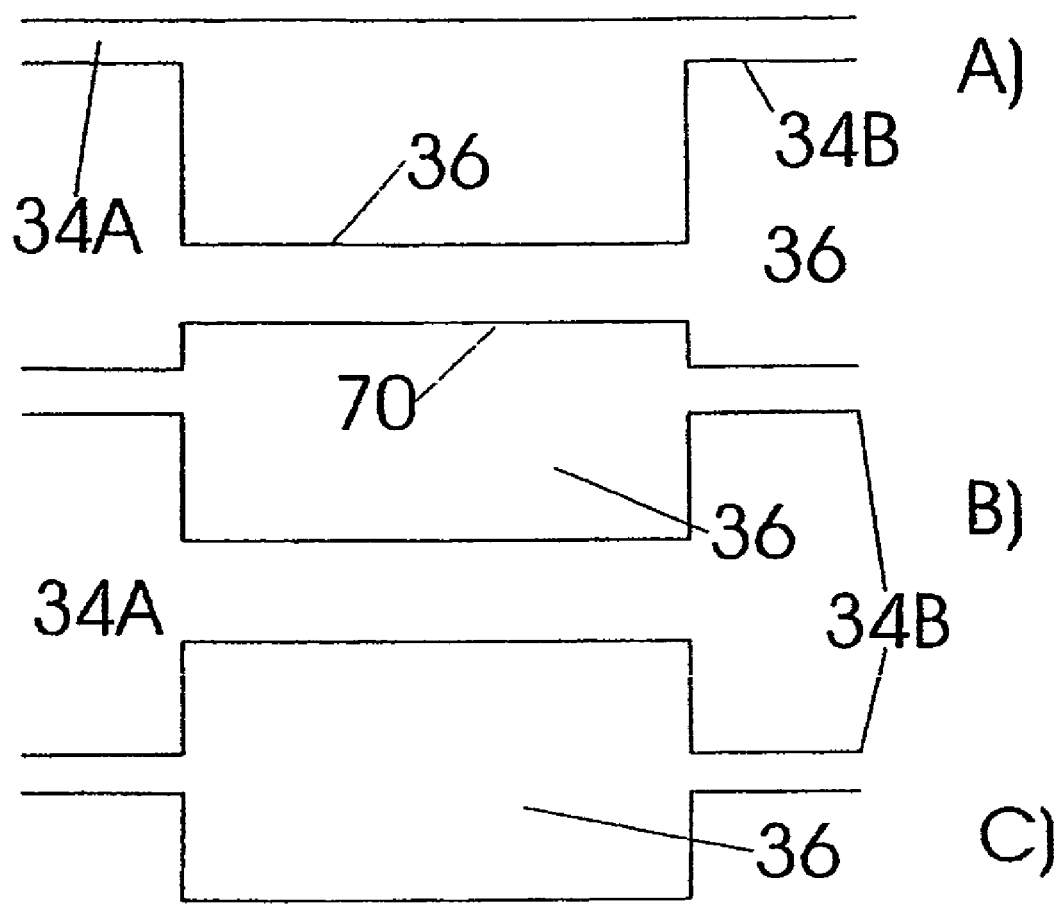
FIG. 7 shows an illustration in the form of a schematic plan view, showing further details for the relative arrangement and orientation between a micromirror and a bridging element according to variants a), b) and c), corresponding to the exemplary embodiment shown in FIGS. 5 and 6.

FIG. 7 shows an illustration in the form of a schematic plan view of further details relating to the relative arrangement and orientation between the micromirror and bridging element on the basis of variants a), b) and c), corresponding to the exemplary embodiment shown in FIGS. 5 and 6;

In FIG. 7a), the micromirror 36 is connected at the edge to the bridging elements 34 A and 34 B. In this embodiment, only a single electrode pair may be used on one side of the pivoting axis in order to carry out the mirror movement. This electrode pair would then advantageously be arranged at a specifically preselected distance from the pivoting axis, to be precise both in the case of the electrode on the micromirror and in the case of the electrode on the base mount 30.

In the case of the variants shown in FIGS. 7 B and 7 C, small electrode pairs can in principle be fitted on both sides of the pivoting axis which is defined by the bridging elements 34 A and B. The variant shown in FIG. 7 B in this case contains the broadest variation options in order to allow as extensive a pivoting movement of the micromirror 36 as possible. This is because, if the actuation voltage can be chosen to be high enough in order to make it possible to act on the short end 70, then a wide angle range can be implemented without any risk of the micromirror in its extreme deflection position touching the opposing electrode in the situation where there is attraction between the two elements.

For the sake of completeness, FIG. 7 C once again shows the situation in which the mirror halves are split symmetrically.

A further preferred exemplary embodiment of the present invention will be described with further reference to FIG. 8, which is distinguished by a micromirror element being mounted in the form of a universally-jointed bearing with respect to two essentially mutually independent pivoting axes.

Figure 8:
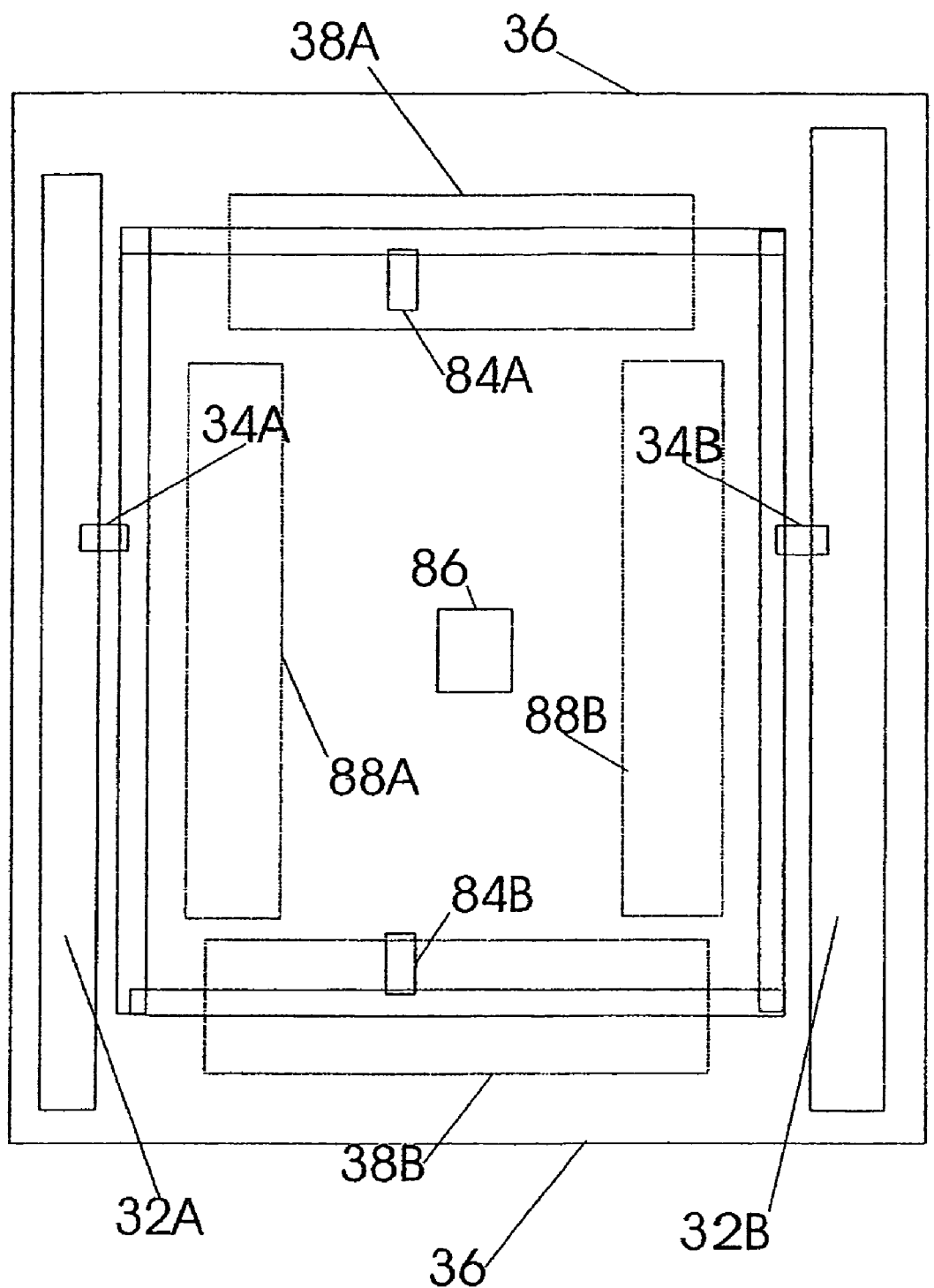
FIG. 8 shows an illustration in the form of a schematic plan view of an individual body of a further preferred embodiment of the present invention, in which a micromirror is mounted in a universally jointed manner.

FIG. 8 shows an illustration of a schematic plan view of a further preferred embodiment of an individual body according to the present invention, in which a micromirror is mounted in a universally jointed manner. The holding elements 32 A and 32 B, respectively, in FIG. 8 are associated with the left and right-hand edges of the illustration, respectively. The bridging elements 34 A and 34 B in each case lead inward from these holding elements from a common pivoting axis, see FIG. 5 and FIG. 6, where they meet a pivoting frame 80. This is in the form of an electrode and can interact with one or two opposing electrodes 38 A and 38 B, respectively, see the description relating to FIG. 5 and FIG. 6. This results in a pivoting movement of the pivoting frame 80 about the common pivoting axis of 34 A and 34 B. A further pivoting bearing is now provided within the pivoting frame 80, specifically about a pivoting axis which is formed from an inner bridging element 84 A and another inner bridging element 84 B, which each connect the pivoting frame 80 to the micromirror 36, or its fixed support 86.

Furthermore, at least one actuation electrode 88 A or, in order to ensure the full angle functionality over a range which is as wide as possible, a second actuation electrode 88 B as well once again is or are provided in order to make it possible to move the micromirror around the above-mentioned second pivoting axis (around 84 A, 84 B axes). With the simplicity of its design, FIG. 8 should be regarded essentially only as an example of a universally jointed bearing. In addition, of course, the pivoting frames or micromirrors need not necessarily have rectangular shapes.

In order to allow the overall surface area to be filled better with a mirror surface of micromirrors, the inner surface that is shown in FIG. 8 may also be used only as a support in order to allow the micromirror 36 to be fitted raised from the plane of the paper, in the Z plane. This has the advantage that the mirror surface can be much larger and scarcely restricts the mobility of the micromirror 36 at all if the tower-like support 86 is designed correctly.

Figure 9A:
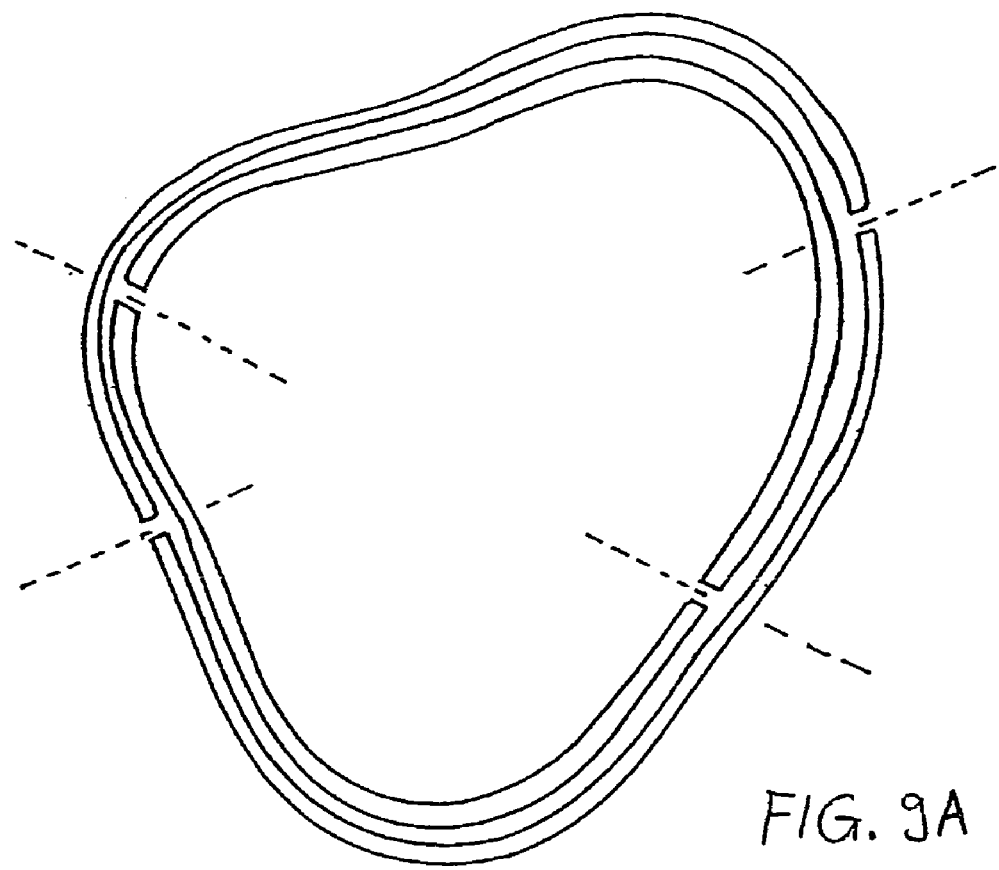
FIG. 9A shows an illustration in the form of a sketch of a development of the individual body which is mounted in a universally jointed manner, as shown in FIG. 8 and with a non-rectangular shape.
Figure 9B:
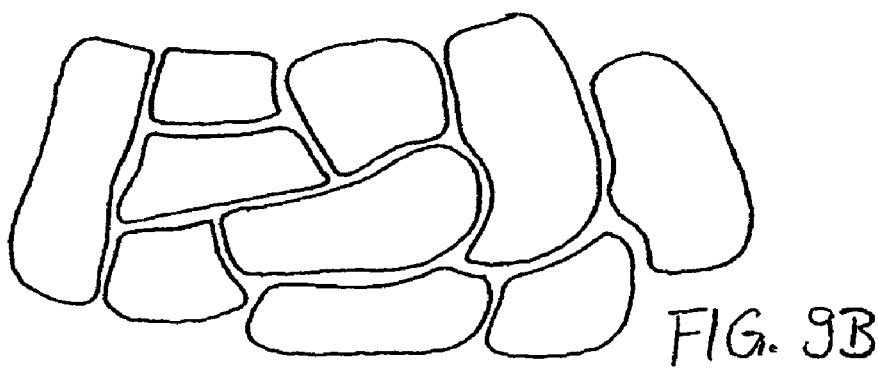
FIG. 9B shows an illustration in the form of a schematic detail of an arrangement, filling an area, of irregularly and differently shaped micromirrors, as part of an individual module 12 according to one particular aspect of the present invention.

One variant of the particularly preferred embodiment shown in FIG. 8, in which the two pivoting axes are not opposite one another at right angles, will be illustrated and described in further detail with further reference to FIGS. 9A and 9B. Furthermore, the mirror shape is likewise not rectangular but has an external contour without any corners, as is illustrated by way of example in an arbitrary form in FIG. 9, in this case being approximately pear-shaped, in order to show that virtually any desired shape can be chosen in this case. In this case, the actual structural design of the micromirror mounting is changed only to the extent that is necessary for the design to comply with the changed geometry of this irregular form. By way of example, the locations of the electrodes are appropriately adapted, and the distances between the holding elements, etc. To this extent, the description of the design of the individual body with the rectangular micromirror mounted in a universally jointed manner can be used for the further details.

Particularly if the surface area of a micromirror element is chosen to be somewhat larger, for example in the region of 20 mm$^2$, then the viewer will not perceive deliberately chosen irregular shapes of the mirror elements with the naked eye at all until a certain distance of a few meters or less is reached. It may therefore aesthetically be advantageous to fill the entire surface area, as is shown by way of example in FIG. 1 using the example of the window surface, with an arrangement, which to a certain extent fills the surface area, of a large number of irregularly matched mirror elements 36, as is indicated in FIG. 9B. In this case, particularly when the aim is to fill a large percentage of the surface area, care should be taken to ensure that the contours of adjacent mirror elements are as closely adjacent to one another as possible, that is to say that the remaining gaps between the outer contours are as small as possible.

The example as shown in FIG. 8 of the universally jointed mounting with the inner support 86, and the capability mentioned there to raise the mirror element out of the plane of the pivoting frame 80 results in the capability to design the size of the mirror to be essentially independent of the size of its substrate, which is responsible for its pivoting bearing. If the distance between the lower face of the mirror element and the upper face of the pivoting frame 80 is chosen to be sufficiently large, then, just on the basis of simple geometric considerations, this results in the maximum possible pivoting angle before the micromirror strikes an area of the pivoting frame or of the projecting holding elements 32.

One fundamental aspect for the use of the product according to the invention will be explained with further reference to FIG. 10 and with supplementary reference to FIG. 1. FIG. 10 shows an illustration in the form of a schematic cross-sectional sketch of a panel according to the invention composed of individual modules 12, installed in a window, illustrated in a simplified form.

In order to improve the clarity, FIG. 10 is simplified by not showing the micromirrors 36 in their true size, but illustrating them somewhat enlarged in order to indicate the beam path and the principle of deflection of the light which is incident from the outside (from the left) in the drawing.

In the section illustration shown in FIG. 10, an upper and a lower end section 10 of a window frame bound the glazed area of the window, as is also illustrated in FIG. 1. The outer pane 90 and the inner pane 92 of this double-glazed window are illustrated only schematically as a line, and the micromirrors 36, 36', 36", 36'", from the same individual module 12 or from different individual modules 12, refer back to FIG. 1, are in some cases illustrated at different angles to one another relative to the incident radiation. In this case, the illustration should be regarded as being only schematic, because only a single micromirror is illustrated, greatly enlarged, for one beam.

The micromirrors in the upper area reflect the light that is incident obliquely from above into the room interior, to be precise onto its ceiling, which is not illustrated. This is achieved specifically by adjustment of the angle θ, which denotes the angle between the vertical plane and the incident radiation.

In a lower-lying area, for example at a height of about 1.40 m to 1.80 m above the floor, the micromirrors 36' and 36" can now be set such that they reflect the sunlight from the outside back to the outside again, in order to prevent people from being dazzled, but to allow stray light through. As can easily be seen from FIG. 10, this can be achieved by tilting a micromirror through about 70 degrees. In this case, the vertical alignment of the micromirrors is preferably chosen to be the rest position which can be assumed when there is no voltage or current, that is to say extending upward from the bottom in FIG. 10, in which case the expression no voltage should be understood here as meaning "without any electrical bias voltage".

In an area located further downward, for example at less than 1.20 m above the floor, the micromirrors 36 can once again be set differently, specifically being aligned vertically, so that it is not possible to look through the window from the outside. This also means that the solar radiation is likewise reflected back upward. These possibly advantageous effects of additional illumination of a room by deflection of the incident light preferably onto the room ceiling, thermal protection and visual protection can be achieved in a satisfactory manner, at least for visual protection and heat protection, by individual modules 12 (FIG. 1) in which the respective micromirrors 36 are in each case mounted such that they can pivot about only a single axis, specifically about the horizontal axis, which lies on the plane of the window. As seen by an observer who is standing in the room and is looking outward through the window, this horizontal pivoting axis results in an "up/down" degree of freedom for light deflection.

This degree of freedom is annotated by the angle θ in conjunction with the present invention.

As can easily be developed further by thought from FIG. 10, the second degree of freedom is obtained by means of the second pivoting axis, as mentioned above, of the mirror, specifically a pivoting axis which is in each case more or less vertical and likewise on the plane of the window. This allows specific control of "right-left" guidance of the light beams in order to deflect the beams on the basis of a variation of an angle φ, for example defined between the normal to the window plane and the mirror alignment about the last-mentioned pivoting axis, which is located on the plane of the window. Since the light source, which is located outside (for example the sun varies over time or a headlight is in a fixed position), generally illuminates the window obliquely from above or obliquely from the side, the control capabilities described above can compensate for the movements of the light source, or specific movements of the deflected light can be provided deliberately in both angular degrees of freedom.

As is evident without any doubt from the teaching described above, the individual modules 12 throughout an entire window panel can now be reached by program-controlled driving of the individual micromirrors 36 in order to deflect, for example, all of the direct sunlight onto a relatively small area on the room ceiling. This spot, which is then illuminated such that it is bright, can also be shifted to the right or left, depending on the selected angles. Such specific focusing of the direct sunlight is achieved easily by varying the extent of the micromirrors in the panel from right to left and from top to bottom, in each case continuously and in small steps, and to such an extent as is currently required in order that each individual micromirror can guide the beam falling on it precisely to the specifically preselected target area. This can be done in an appropriate control program in the controller 18, which is associated with the entire system, by the implementation of elementary, geometric formulae and relationships. A corresponding driver which maps the electromechanical characteristic of the panel can be used in order to produce specific appropriate control commands for each individual micromirror.

The following text provides fundamental guidelines for the production of a micromirror apparatus according to the invention. First of all in this case it can be stated that the production is based on conventional thin-film production processes which are known from the prior art, in which thin layers are produced by vapor-deposition, spin-on deposition, dip coating, sputtering, electroplating, etc. and can then be structured by further lithographic production processes on a small area and generally based on a plane-parallel structure carried out on the previously applied layers, depending on the size of the structures in the photomask. In this context, reference shall be made entirely to textbooks which describe the above-mentioned techniques.

Production Process:

The most important production features will be explained in the following text by way of example for the exemplary embodiment shown in FIG. 5, as follows:

I. For use in the window area and in order to produce individual modules with a square shape and an edge length of barely 12.5 cm, a thin glass pane is used as a glass substrate with these dimensions as the base mounting surface 30. A different transparent material, organic glasses (for example Plexiglas), transparent plastics or polymers, possibly with the addition of a toning dye, can also be used instead of inorganic glass.

II. In a second step, planar electrodes 38 A and 38 B as well as the associated drive network for the conductor tracks are applied, for example by vapor-deposition of conductive materials, for example metals (aluminum, . . . ) or for example ITO (indium tin oxide) or, for example, conductive polymers (poly [p-phenylene], . . . ), to the glass substrate 30, possibly assisted by electrochemical reinforcement. This step can be carried out by vapor-deposition of the electrically conductive materials, linked to conventional lithographic structuring techniques. Where lines cross, lines are isolated from one another as in the normal manner by means of an insulating intermediate layer.

IIIa). In a third step, a sacrificial layer is applied with a defined thickness, which is predetermined essentially by the height of the holding elements 32 A and 32 B illustrated in FIG. 5. The height of the sacrificial layer should be at least sufficient that the intended, maximum pivoting deflection of a micromirror element 36 can take place without the micromirror striking against the base plate 30. This sacrificial layer is intended to form the holding blocks 32 A and 32 B. They must subsequently remain at these points, although the sacrificial layer is subsequently etched away again at all the other points in order to form a free space to allow the subsequent mirror pivoting. In order to ensure high transparency, the sacrificial layer is preferably removed down to the glass substrate at these points. This can be done perfectly using modern technological processes. The maximum overall transparency of the window is in this case governed only by the ratio of the "transparent openings" to "non-transparent frame". It should be noted that the frame can also be designed to be transparent (for example electrical lines composed of transparent ITO, holding blocks composed of Plexiglas and a base plate composed of inorganic glasses).

The materials which can be used for the sacrificial layer are primarily those which can be selectively etched with respect to all the other materials used and which are relatively insensitive to weather, moisture and temperature differences, have adequate mechanical strength and are not subject to any significant plastic flowing (without hysteresis). These include, for example, materials such as polymethyl methacrylate, silicon dioxide or a UV photoresist, provided that it can be applied with a defined thickness.

The material class of thermotropic main chain liquid crystalline polymers should also be mentioned by way of example. This material class can on the one hand be dissolved well using specific organic solvents (sacrificial layer characteristic), while on the other hand it satisfies relatively stringent mechanical robustness criteria, provided that these materials are used at the same time as part of the holding blocks.

III.b). As an alternative to IIIa), a variant is specified which produces increased strength holding blocks. In this case, process step IIIa) is essentially carried out as follows. A photoresist (for example PMMA) that is compatible with deep lithography is applied for this purpose, in which the shapes of all the holding blocks are defined by exposure and development as a negative. Stable holding blocks are defined by selective filling (for example electrochemical processes).

This is then followed by the process steps IV, V and VI described further below, in which the remaining photoresist (sacrificial layer) is removed wet-chemically. Furthermore, in this case, process step II can be modified in such a way that conductive base surface layers, which are suitable for the electrodes on the base plate, are at the same time defined on the holding blocks, and each actually have the same shape as the holding block/base plate connecting surface. In this case, care must be taken to ensure electrical isolation between the upper and lower electrodes. It is also advantageous to use the LIGA technique with cost-effective forming steps.

IV. In a further production step, a layer is applied which forms the mirrors or, according to one particular embodiment variant, the optical filters, and the bridging elements 34 A and B with their holding layers on the holding elements 32 A and B. The material may, for example, be a single metal layer, for example composed of aluminum, or a dielectric multiple layer with an outer electrically conductive but transparent layer (for example ITO), or a polymer layer with highly reflective and conductive characteristics.

In one low-cost exemplary embodiment, the conductive layer extends over the mirrors, the connecting links and over the holding layers, and is at the same time used as an electrode (particularly on the mirror surfaces), as a conductor track (particularly on the connecting links) and as holding layers on the holding elements.

V. In a further step, circumferential spacers are preferably applied at the edge of each individual module, for example composed of the same material as the above-mentioned sacrificial layer, in order to make it possible to apply an outer protective layer in a further (subsequent) step, which extends flat over the entire module surface, in order to provide a hermetic seal against dust and moisture as well as voltage protection. This protective layer may, for example, be applied by adhesive bonding to the above-mentioned spacers, and is particularly preferably in the form of a circumferential edge boundary.

VI. The vertical structuring is carried out in a next step by carrying out an etching process at right angles toward the base plate 30. The parts of the sacrificial layer as described above are then selectively removed, producing the connecting links and mirrors.

VII. In a further step, the connecting plugs for electrical connection of the individual modules to one another (refer back to FIG. 2) for the electrical contacts 24 and the mechanical connections 22 are applied, and are firmly connected to the module frame and conductively connected to the drive network for electrical contact.

The infrared sensor 16 as mentioned above in the description relating to FIG. 1 likewise makes contact with the point on the drive network provided for this purpose, and the connecting contact as mentioned above is provided for the DC voltage supply line 20 by means of a suitably provided connecting plug 21, preferably on only one module, for example the individual module 12 which will subsequently be associated with one of the corners of the window surface.

Depending on the subsequent use of the module manufactured in this way, a hermetic sealing varnish can optionally be applied over the entire edge area of the module in order to ensure that the module interior is in a long-term stable, weather-resistant state.

Figure 2:
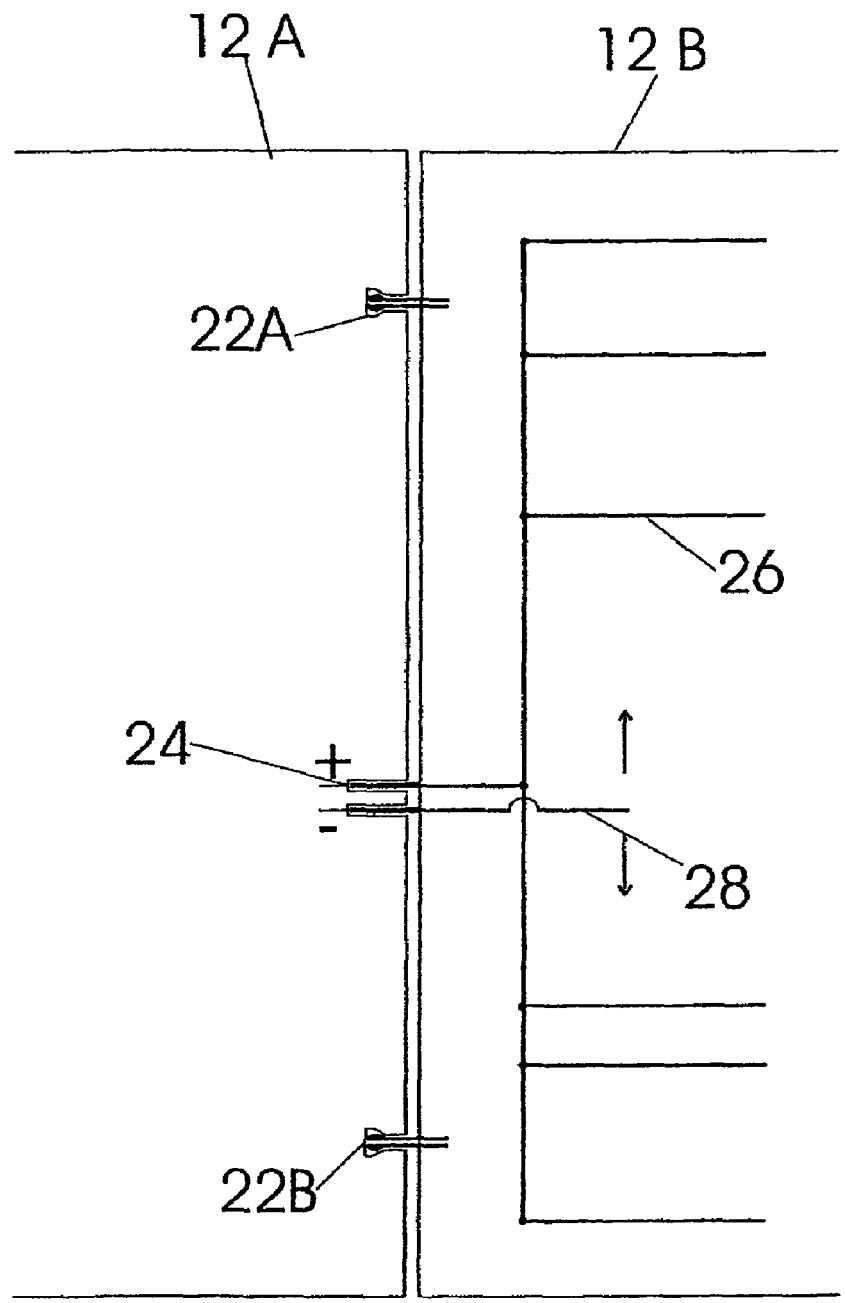
FIG. 2 shows a schematic illustration of the edge coupling apparatuses between two individual modules 12 from FIG. 1.

The modules produced in this way are then plugged together, as is sketched in FIG. 2, until a panel of the desired size is formed. For example, in the case of an individual module size of 12.5 cm×12.5 cm, an array of 8×8 individual modules can be plugged together in order to produce a cohesive panel which can subsequently be inserted as an entity into a window of sufficient size, thus resulting in an arrangement as sketched schematically in FIG. 10. For this purpose, the individual modules 12 also advantageously have latching-in connections 22 A and B, which can be plugged in in a suitable form, on the other edges, although these are not shown in FIG. 2. In this case, the latching-in connections in the lateral direction may also be of a different type—for example an L-shaped catch—in comparison to the type in the longitudinal direction as shown in FIG. 2, in order to make it easier to plug them together.

This entire panel can now also optionally be fitted to a further mount 15 which may, for example, be a further glass pane. This will be particularly worthwhile if the entire panel is required to be more mechanically robust. It can then be used as appropriate in the manufacture of the windows.

In a modification of the above description, the concept according to the invention can also include the mirror element being in the form of a Bragg filter element, thus making it possible to provide an adjustable filter function for predetermined wavelength ranges by means of a control voltage, which is applied between the electrodes, and mechanical actuation produced in this way.

Alternatively, the connecting links, mirrors and holding blocks can be produced from originally flat elements (see, for example, M. H. Kiang, et al. IEEE Phot. Technol. Lett. 8, 1707 (1996)).

The micromirror arrangement according to the invention can be produced in many different ways, as is obvious to those skilled in the art in the field of thin-film production and microstructuring. The only characteristic feature of the production method according to the invention is thus the use of those materials which allow an advantageous price/performance ratio for large-area use in windows or in the facade area.

A further advantage is that the overall system according to the invention can preferably be designed such that it can be operated in a low-voltage range of less than about 60 volts. This requirement should be taken into account in terms of the lever forces to be produced in the shaping of the individual bodies, that is to say for the holding element 32, the bridging element 34 and the mirror element 36, in order that the required actuation voltages are not excessively high for implementation by means of electrostatic attraction forces.

Uses:

The present invention opens up a wide spectrum of usage options for a panel 15 according to the invention, the overall system and for individual modules 12 according to the invention. These are sketched in the following text:

First of all, an overall system according to the present invention and comprising a panel, power supply, drive sensor and controller can be fed with various further input variables in order to achieve a respectively individual aim. A sun level sensor may be quoted as one example, and a further "person sensor system", for example an IR camera which interacts with an ultrasound system in order to find the position of the person. With regard to this person sensor system, reference should be made to the relevant prior art, for example in the field of monitoring of the interiors of passenger vehicles. It is then possible to define a control aim of better illumination in all cases in the directly surrounding area in the room where the person is in each case located.

In this case, the controller 18 would be connected both to the sun level sensor and to the person sensor system, with appropriate programming allowing the mirrors to be adjusted depending on the current sun level and the current location of a person. For example, an area of 1 square meter on the room ceiling above the person can in each case be illuminated by deflection of the direct sunlight to this point, thus always providing relatively bright illumination for the person and the area directly surrounding him or her, that is to say his or her working area. Obviously, a person skilled in the art can also identify other control aims as being worthwhile, and implement them on the basis of the same principle, or a modified principle, as proposed in this document. For all pure light deflection purposes, it is recommended that relatively highly reflective materials be used. The mirror surface should thus be composed of a relatively highly reflective metal or polymer, or of a dielectric multiple layer structure as has already been described above, or it may also be composed of a combination of such materials, depending on the given circumstances.

It is thus possible to achieve the advantage for the field of light deflection of window surfaces of reducing the very major brightness contrasts which would occur in a room in particular when the sun is shining directly through the window, and of being able to positively influence the brightness distribution in the room, depending on the user's wishes. In addition to the dazzling protection, heating protection and vision protection effects which have already been explained further above in conjunction with FIG. 10, the micromirror arrays according to the invention may, however, also be used for solar heat recovery, for example by specifically using the focused radiation to heat a fluid which can circulate in a pipe system or by using the radiation reflected onto the ceiling to liquefy a gel, which solidifies again as the room temperature decreases and in the process emits the energy that it releases into the room.

Furthermore, of course, artistic accents can also be achieved in the room by specific control of the individual micromirrors. For example, it is possible to project light patterns onto the wall using only the sunlight coming from the outside, or else by using a further light source, such as a bright halogen headlight which, for example fitted to the outside of the facade, acts so to speak as an artificial sun. Furthermore, the principle according to the invention can also advantageously be used to control the intensity of the thermal radiation which implicitly enters the room by virtue of the natural solar radiation.

If, according to a further preferred embodiment variant, the micromirrors are in the form of dielectric multiple layers, then optical edge filters or bandpass filters with a different spectral characteristic can be produced deliberately. Spectral tuning can be carried out by variation of the pivoting angle (tilt angle). In this case, simple DBR mirrors or else FP filters based on at least 2 DBR mirrors may be used. The optical principles relating to this can be found, inter alia, in Kasap, "Optoelectronics and Photonics", Prentice Hall 2001. In this case, the IR component of the sunlight could, in particular, be controlled as appropriate for the time of year. In hot seasons or during hot times of the day, the majority of the IR radiation would be reflected and would not enter the room, while the opposite procedure would be adopted during cold seasons or during hot times of the day.

In comparison to conventional window elements for light deflection, the mechanical loads resulting from wind and rain, for example, are completely precluded, since the micromirrors are preferably used in the interior of a double-glazed window. They may, of course, also be fitted retrospectively to the inside of single glazing, without major problems. However, a further considerable advantage is also obtained by making advantageous use of the fact that a component is necessarily subject to reduced mechanical stresses during its pivoting movement the smaller it is, because micromirrors such as these and their arrays require increasingly less maintenance and their lifetime becomes longer as their size decreases. These effects are highly significant even for mirror areas of less than 1 mm². As a person skilled in the art in the field of micromechanics will undoubtedly see, there is thus a considerable advantage in the use of the micromirrors according to the invention, particularly when they are constructed in a range with an edge length of considerably less than 1 mm, and with an area of less than 1 mm².

Furthermore, a micromirror module according to the invention can also advantageously be used as a component outside window areas, specifically in the facade of buildings. In this case, it should not be transparent but carries out its function by deliberately deflecting the incident sunlight in different directions. This makes it possible to deliberately produce patterns in a panel, and it is even possible to produce large patterns along adjoining panel areas of more than 10 m, thus making it possible to use a large-area facade as an enormous display. If too little direct sunlight is available to achieve significant light effects, a facade can then be artificially illuminated, thus making it possible to achieve the desired effect irrespective of the daylight conditions. This function as an architectonic component for an aesthetic facade, or for a multifunctional facade in the normal way, possibly in conjunction with the use of DBR mirrors with a color filter function, opens up an enormous potential for producing colors on facades, in order to enormously enrich "city" life, because by far the greater majority of the surfaces that are perceived in cities are nothing more than building facades.

According to further variations, the micromirrors may be composed of different materials on their front and rear faces, and even in the interior. This results in a wide range of variation options. The following are mentioned just by way of example:

One surface can absorb the light coming from the outside and can be converted to heat, while the other surface can be designed to be highly reflective. If the mirrors now have a further pivoting range such that either the absorbent surface or the highly reflective surface is struck by the sunlight as desired, different effects can be achieved in a respectively individual spectral range:

For example, in winter, it may be desirable to allow infrared radiation to pass through the window from the outside and to reflect infrared thermal radiation from the inside back into the internal area again. It may likewise be desirable to allow the visible spectral range to be transmitted from the outside to the inside, in each case controlled by the angle of the mirror surfaces. In summer, in contrast, it may be desirable to reflect the infrared radiation from the outside back to the outside again and to transmit the infrared radiation from the inside to the outside, while in contrast allowing the visible spectral components to be transmitted from the outside into the interior of the room. Respectively, individually selected mixed operation may take place in spring and in autumn, or during the dusk and dawn times between day and night.

In particular, the use of dielectric multilayer mirrors according to the invention makes it possible to satisfy such complex requirements with the aid of different spectral stop bands and by the variation of the pivoting angle, at least to a considerable extent, as already mentioned above. Windows such as these then have an extraordinary high functionality, and an enormous energy saving potential.

In a low-cost variant of the micromirror apparatuses according to the invention, the mirrors have no rotation axis whatsoever, and instead of this it is possible to vary the mirror shape and its orientation with respect to the common base mounting surface, as a function of the positions of the mirrors in the surface. If the mirror shape and the mirror orientation are varied, then this will also generally influence the shaping of the suspensions and anchoring elements for the mirrors, that is to say the holding elements 32 and bridging elements 34 explained in the drawings. In this case, computer optimization specifically to the desired application is worthwhile. The following aspects should be given particular consideration during this optimization process:

The orientation of the facade with respect to the direction of the sky and the position of the building with respect to the geographical latitude and the angle ranges within which the building is seen in most cases by those passing by. These influencing factors can be given a quantitative weighting in order to achieve a desired optimum. In a situation such as this, this results in a fixed setting of the pivoting angles or, in the case of curved mirror surfaces, in a permanently preset curvature orientation of the mirror surfaces. Without actuation, the geometric shapes and orientations of the anchoring points for the mirror elements vary in the surface of the mirror array, resulting in a specific optical effect. This makes it possible to achieve a light intensity change as a function of the facade location. The intensity is in this case governed by the duty ratio between the effective mirror areas and the absorbent or scattering surface components.

A minor variation of the mirror curvatures as a function of the external temperature in this case also results in periodic color shifts over lengthy time periods.

If the aim is to illuminate a room, two rotation axes for each mirror element are desirable for effective illumination, both of which should have a pivoting angle range of approximately at least 40 degrees.

As a modification of the above-mentioned "bulk micromachining" for production of micromirror arrays for window surfaces, it is also possible to use less costly "surface micromachining" for applications on facade surfaces, since small angles are sufficient in this case.

Furthermore, the micromirror arrays according to the invention can also advantageously be used as an individual module 12 or as a panel 15 comprising a large number of assembled modules 12 for the deflection of artificial light for lighting technology purposes, in order to achieve various lighting aims. In this case, it is possible to achieve, in particular, variable lighting distributions, with particular accents.

Furthermore, the micromirror arrays according to the invention can also highly advantageously be used for concentration of sunlight, for example for solar-thermal utilization, even in the order of magnitude for power station requirements. This is because, in comparison to conventional mirror arrangements with macroscopic mirrors, the mechanical loads on micromirrors according to the present invention are considerably reduced. This leads to considerable savings in design and maintenance, and to a considerably longer life of the reflective installations. A similar argument applies to the deflection and concentration of sunlight for other purposes, for example for photovoltaic concentrator systems. Furthermore, the micromirrors, modules and panels for the deflection of sunlight according to the invention can also advantageously be used, when used in facade and ceiling elements, in order to selectively use the solar radiation for passive heating or for active use in collector systems and/or photovoltaic systems.

The relevant person skilled in the art in the respective field of the various uses of the micromirror arrays according to the invention as outlined above will see that an overall system according to the invention can advantageously be operated with further sensor systems which are then specifically chosen for the respective application. For example, a sun level sensor and optionally an additional further sensor system can advantageously be used for all applications in conjunction with solar radiation, detecting the cloud distribution and/or the brightness distribution in the hemisphere covered by the sensor system, or directly in the sky. One particular advantage in the field of solarthermics resulting from the inventive concept is that it is possible to direct the individual micromirrors on an individually controlled basis at a specific point, so that the radiation can be specifically deflected onto the geometry of the elements to be heated. This directed, individually controllable beam deflection, in particular for direct sunlight, can thus be provided even for completely irregularly shaped radiation absorber bodies. In comparison to conventional macromirrors, this leads to the expectation of a considerable increase in the efficiency of the solarthermic system.

Furthermore, the relevant person skilled in the art will likewise understand that a deliberately chosen radius of curvature of the micromirror elements will also allow focusing of parallel incident light beams, in particular of sunbeams. In this case, the distance between the mirror element and the desired focusing plane or focusing point must then be matched to the radius of curvature. This advantageous feature can also be highly advantageously used in conjunction with the capability for slight readjustment of the individual micromirrors in the field of solar energy, for example the focusing effect in the field of solarthermics where sunbeams are focused onto a relatively small spatial point, the absorber, or in the field of photovoltaics, in which the entire surface area of a solar panel should primarily be irradiated as uniformly as possible and as intensively as possible.

In the prior art, light is focused onto high-performance solar cell surfaces with macroscopic hollow-mirror arrangements. These overall arrangements are often designed such that they can be readjusted. However, those skilled in the art will be aware of the enormous susceptibility of these systems to wind pressures. Since micromirrors which can be swiveled individually are used according to the invention, they can be fixed on more robust units, in which case the overall unit now need be moved only slightly or need no longer be moved at all in the ideal case.

According to one further advantageous aspect of the present invention, the light deflection which can be achieved deliberately even over relatively wide angular ranges also makes it possible to use solar cell arrays with different efficiency and thus different procurement costs alongside one another, and for the micromirrors according to the invention to be supplied individually with light at different times of day.

According to a further, advantageous aspect of the present invention, the micromirror arrangements according to the invention can also be used for specific light deflection without providing any moving micromirrors. In this low-price variant, the mirror shape and the mirror orientation are varied in accordance with a predetermined pattern on the array surface on the basis of a computer optimization carried out in advance, and related specifically to the application. The fundamental idea in this case is that, when used in the field of solar energy, there is always a certain area element on the micromirror panel according to the invention which deflects the incident sunlight precisely correctly onto the target object. Specifically, this can be designed such that, for example, an area element in the left-hand lower corner of the panel according to the invention produces the desired light deflection around 9 o'clock in the morning, while this is produced by a central area element around 12 o'clock midday, and is produced by an area element which is in fact associated with the upper right-hand edge of the panel around 5 o'clock in the afternoon.

As can be seen from this example, other area elements which are not used at all for a specific predetermined target object can deliberately be designed in order to apply deflected light to a further target object, for light deflection. This second object would then be illuminated by those area elements which were not used in the above-mentioned example, with such double use having no disadvantageous effect. It will also be obvious to the relevant person skilled in the art that the inventive concept as described above can also advantageously be used in hybrid systems such as combination systems comprising photovoltaic and photothermic systems.

Although the present invention has been described above with reference to one preferred exemplary embodiment, it is not restricted to this but can be modified in many ways.

For example, the dimensions of the surface of the individual modules can be matched to production installations which already exist and have already been used for the production of IC components, hard disks in the computer field, etc.

Furthermore, the electrode which is associated with the micromirror element may also be formed integrally with it, provided that it is composed of electrically conductive material.

The micromirror element can also originate from the same layer as the bridging element, provided that the two are separated from one another by a cutout which defines the bridging element (for example by etching, see FIG. 4 and FIG. 6).

Finally, the features of the dependent claims can essentially be freely combined with one another and not necessarily in the sequence used in the claims, provided that they are independent of one another.

Further applications exist in the presentation of text and/or graphics in each case resolved on a pixel-like basis. For this purpose, by way of example, all the window surfaces in a room except for one with the appropriate micromirrors are darkened, and a window with light passing through it is used as a display generator surface. The actuation signals for the individual micromirrors or groups of them are passed on by a computer via a controller and the electrical supply lines to the individual micromirrors (or groups). In this case, all gray levels can be driven as required. The image itself is then created by deflection of the sunlight or the light from a headlight on a screen surface which is located in the room interior behind the window, for example a wall of a suitable color.

Further application options are deliberate light deflection by the replacement of the reflector-like mirrors which exist in many artificial light sources by controllable or rigid multiple mirror arrangements, which can be physically flatter, since the hollow-mirror effect can be achieved by individual angle adjustment of the micromirrors rather than, as in the case of the prior art, by an invariable 3D spatial space of an integrally designed 3D mirror surface. The micromirrors are in this case advantageously separated from one another such that there is as little shadowing of the micromirrors by one another as possible.

For Motor Vehicle Headlights:

When turning or as a result of ripples in the ground and potholes in the roadway, the light beam often moves away from the relevant area and can in general lead to dazzling of the oncoming traffic. Within the scope of the solution according to the invention and in conjunction with more modern techniques for selective driving of "pixel light", for example as disclosed in the German Journal STERN 41/2002, page 118 to page 120, stable brightness distributions, which are safe from the traffic point of view, can be achieved with controllable mirror arrays and using a separate controller according to the invention, in which case the costs can be further reduced by the use of the materials according to the invention. In this case, the headlight mirror surfaces may also be planar or only slightly curved, because the individual mirrors or groups of them may have a rest position at a greater angle the further outward they are located in the reflector area, from which they could be moved further outward when this is necessary. A "flat headlight" such as this according to the invention can advantageously be used to create a new design element for the automobile field, with the headlight requiring less installation space.

For Halogen Lamps and Fluorescent Lamps:

The light sources which are generally permanently installed in the room and have different intensities and emission angles result in room illumination which is highly distance-dependent and is inhomogeneous. In this case, the light does not always fall precisely on the points at which it is required. Within the scope of the solution according to the invention, considerably better brightness distributions can be achieved even with mirror arrays based on in each case only one rotation axis per mirror element. Furthermore, deliberate light deflection with or without deliberate focusing is possible in conjunction with a person sensor as described above. Accents can also deliberately be created for object illumination (for example a statue, image).

Many light sources have reflectors which are already curved, referred to in the following text as "lamps on a reflector basis" (for example lighting units on the basis of fluorescent lamps or halogen lamps). These reflectors could be replaced, for example, by one or more panels. In one exemplary embodiment, three planar panels are each positioned at an angle of 90° to one another. This arrangement is based on retro-reflectors (corner cubes). However, curvature of the panels can also be achieved by a film-like structure.

The invention claimed is:

1. An apparatus with mirror elements for large-area light deflection, characterized in that:
   the apparatus forms a panel which has a drive network comprising planar lines, and a plurality of groups of micromirror apparatuses, each group of the plurality of groups of micromirror apparatuses containing a respective plurality of individual bodies which are connected to a common base mounting surface, with one individual body containing at least one holding element, which is upright above the base mounting surface, for a mirror element which is connected to it and has an optically reflective effect, and with a conductive layer being provided as a common control electrode to produce at least common movement of a group of mirror elements, the planar lines being configured to carry at least a joint control signal to produce said common movement of said group of mirror elements.

2. The apparatus as claimed in claim 1, in which an electrically controllable actuation mechanism is provided for the movement of the mirror elements.

3. The apparatus as claimed in claim 2, furthermore containing: a device for application of a plurality of electrical control variables to respectively different, predetermined groups of spatially adjacent mirror elements, in order to drive the actuation mechanism.

4. The apparatus as claimed in claim 3, in which the actuation mechanism is based on electrostatic forces, in which at least one first electrode is associated with a mirror element, and each of a plurality of at least one second electrodes is associated with at least one individual body and connected to the base mounting surface.

5. The apparatus as claimed in claim 3, in which the device for application of a plurality of electrical control variables for the purpose of specific actuation of mirror elements contains a device for wire-free reception of a plurality of different control signals from a controller.

6. The apparatus as claimed in claim 4, in which the plurality of micromirror apparatuses are subdivided into individual modules which can each individually be connected to one another.

7. The apparatus as claimed in claim 1, in which the mirror elements are in the form of a reflective metal layer or a dielectric multiple layer with an electrically conductive single layer or are in the form of a reflective polymer layer with a conductive single layer.

8. The apparatus as claimed in claim 6, in which the apparatus contains connecting elements, to which individual modules of the same type can be connected at the edge.

9. The apparatus as claimed in claim 8, in which the apparatus contains plug-in connecting elements and in which the connecting elements contain not only the mechanical connection but also an electrical plug-in connection between apparatuses of the same type.

10. The apparatus as claimed in claim 3, in which the predetermined electrical control variable can be predetermined for each micromirror apparatus.

11. The apparatus as claimed in claim 1, in which the mirror elements are either
   a) designed to be flat, or
   b) they have a curved shape.

12. The apparatus as claimed in claim 1, in which a holding element and a mirror element are manufactured from one piece.

13. The apparatus as claimed in claim 1, in which the mirror elements are rectangular.

14. The apparatus as claimed in claim 1, in which the mirror elements are arranged in the form of a regular matrix comprising parallel rows and parallel columns.

15. The apparatus as claimed in claim 4, in which a mirror element is in the form of a structural element of a metal layer or of a dielectric multiple layer with a conductive single layer, or of a conductive polymer layer with reflective characteristics, and in which the mirror element is mounted such that it can move relative to the common base mounting surface, for an actuation mechanism which acts on the mirror element, by virtue of its own predetermined bending stiffness or the bending stiffness of its connection to the holding element.

16. The apparatus as claimed in claim 15, in which each of the plurality of the at least one second electrodes is a flat opposing electrode, which is common to a plurality of or all of the mirror elements, and which is provided on the common base mounting surfaces in which apparatus an electrical supply line leads to an outer edge of the apparatus, and in which apparatus contact between each of the plurality of the at least one second electrodes and each of a plurality of the at least one first electrodes and the device is provided by means of the planar lines, for computer-controlled addressing and actuation of the individual-body movement, in groups, via the plurality of the at least one first electrodes and the plurality of the at least one second electrodes.

17. The apparatus as claimed in claim 6, in which each of the plurality of the at least one second electrodes is a flat opposing electrode, which is common to a plurality of or all of the mirror elements, and which is provided on the common base mounting surface, in which apparatus an electrical supply line leads to an outer edge of an individual module, and in which apparatus contact between each of the plurality of the at least one second electrodes and each of a plurality of the at least one first electrodes and the device is provided by means of the planar lines, for computer-controlled addressing and actuation of the individual-body movement, in groups, via the plurality of the at least one first electrodes and the plurality of the at least one second electrodes.

18. The apparatus as claimed in claim 1, in which a mirror element is connected via at least one bridging element of predetermined bending stiffness to the holding element.

19. The apparatus as claimed in claim 1, in which the mirror element is attached to two bridging elements which, running in a parallel direction, form a pivoting axis for the area of the mirror element, and act on opposite sides of the mirror element, and in which the twisting stiffness of the bridging elements about their pivoting axis can be matched to the electrostatic forces between the electrodes such that a pivoting movement of the mirror element can be carried out with a specifically variable deflection angle relative to the base mounting surface.

20. The apparatus as claimed in claim 19, in which a mirror element is mounted in a universally jointed manner by means of a further bridging element pair, which is provided within the pivoted area according to the preceding claim.

21. The apparatus as claimed in claim 19, in which the mirror element is oriented with respect to the pivoting axis such that a pivoting axis divides the mirror element off-center.

22. The apparatus as claimed in claim 1, in which the mirror element is in the form of a Bragg filter element, and has a filter function which can be spectrally tuned by means of the control voltage which is applied between the electrodes.

23. A building window containing a panel as claimed in claim 1.

24. The building window as claimed in claim 23, in which the panel is provided between two window panes.

25. A system for designing building facades containing one or more panels as claimed in claim 1, a controller for controlling the deflection of mirror elements of the panel, as well as a device for transmission of control signals or electrical control variables to one or more panels.

26. The use of claim 1 for designing building facades, including their windows.

27. A system as claimed in claim 25 for designing building facades, including their windows.

28. A building window as claimed in claim 23, for designing building facades, including their windows.

29. The use of a panel as claimed in claim 1, in an installation for use of solar energy, in which the panel is used to deflect or to focus solar radiation.

30. The use of a panel as claimed in claim 1, with lamps on a reflector basis for specific light deflection and/or light focusing, in which the panel forms at least a part of the reflector surface.

* * * * *

UNITED STATES PATENT AND TRADEMARK OFFICE
CERTIFICATE OF CORRECTION

PATENT NO.        : 7,677,742 B2
APPLICATION NO.   : 10/583490
DATED             : March 16, 2010
INVENTOR(S)       : Hartmut Hillmer et al.

It is certified that error appears in the above-identified patent and that said Letters Patent is hereby corrected as shown below:

On the Title Pg, item (73) should read,

(73) Assignees: Hillmer Vermogensverwaltungs GmbH (DE); Jurgen SCHMID (DE); Volker VIERECK (DE); Friedrich WAITZ VON ESCHEN (DE); Harald WAITZ VON ESCHEN (DE)

Signed and Sealed this

Eighteenth Day of May, 2010

David J. Kappos
*Director of the United States Patent and Trademark Office*